O. CROSBY.
ROPE CLIP.
APPLICATION FILED JAN. 22, 1918.

1,271,283.

Patented July 2, 1918.

WITNESSES

INVENTOR
OLIVER CROSBY
BY
ATTORNEYS

UNITED STATES PATENT OFFICE.

OLIVER CROSBY, OF ST. PAUL, MINNESOTA, ASSIGNOR TO AMERICAN HOIST & DERRICK CO., OF ST. PAUL, MINNESOTA, A PARTNERSHIP.

ROPE-CLIP.

1,271,283.      Specification of Letters Patent.      Patented July 2, 1918.

Application filed January 22, 1918. Serial No. 213,146.

*To all whom it may concern:*

Be it known that I, OLIVER CROSBY, a citizen of the United States, resident of St. Paul, county of Ramsey, State of Minnesota, have invented certain new and useful Improvements in Rope-Clips, of which the following is a specification.

My invention relates to that class of clips used for clamping the ends of wire cables and the like together, and the object of the invention is to provide the shoe or cam device which bears on the cable at one end of the U-bolt with means for limiting the rotary movement of this shoe in either direction and thereby preventing the shoe or cam from making a complete revolution and allowing the cable or rope to clip.

Other objects of the invention will appear from the following detailed description.

The invention consists generally in various constructions and combinations, all as hereinafter described and particularly pointed out in the claims.

Figure 1:
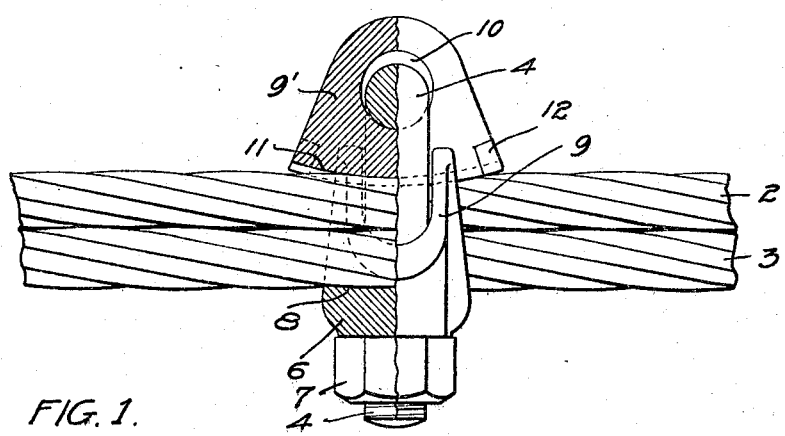
Figure 2:
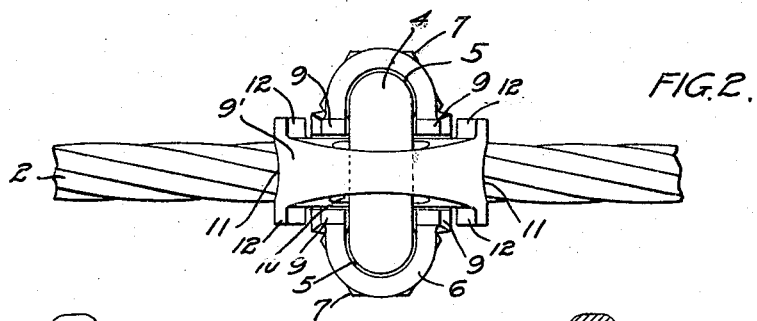
Figures 3, 4:
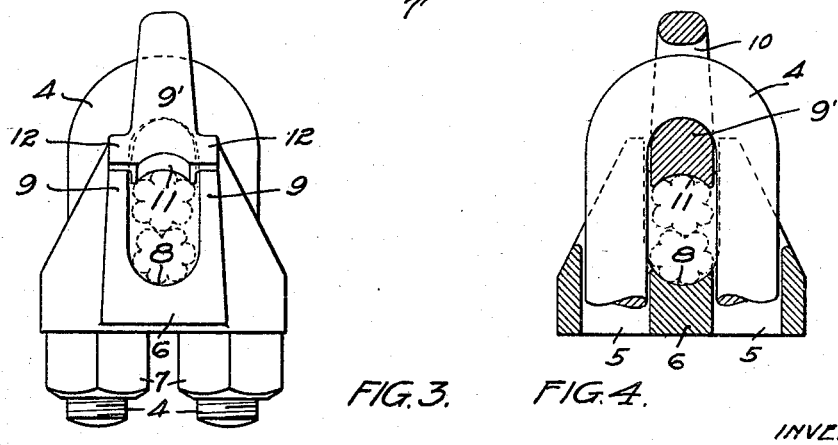

In the accompanying drawings forming part of this specification,

Figure 1 is a side elevation, partially in section, showing my improved rope clamp in use, Fig. 2 is a plan view of the same, Fig. 3 is an end view of the clip, Fig. 4 is a vertical sectional view with the lower portion of the U-bolt broken away.

In the drawing, 2 and 3 represent the lapping ends of a wire rope or cable. It will be understood that the clip may be used on rods as well as ropes, if desired. 4 is a U-shaped bolt having parallel arms to straddle the ends of the rope and enter sockets 5 provided in the block 6, the threaded ends of the bolt projecting beyond the block to receive lock nuts 7 which are seated against the underside of the block to clamp the clip on the rope. The inner face of the block has a gripping surface 8 and extensions or arms 9 are formed on the block projecting upwardly upon each side of the U-bolt and the rope. A cam or shoe 9' is loosely mounted on the curved portion of the U-bolt, having an orifice 10 to receive the bolt, and the cam has an under curved surface 11 which grips the surface of the rope in opposing relation to the surface of the block for clamping the lapping ends of the rope securely together. This cam will hold the rope securely until the rope slips sufficiently to carry the cam past the center and when this is done in devices of this kind as ordinarily constructed, there is nothing to prevent the complete revolution of the cam or shoe and the release entirely of the grip of the clip on the rope.

To avoid this objection to clips of this kind as ordinarily constructed, I provide outwardly projecting lugs 12 at the base of the cam and on each side thereof in position to engage the projections 9 and lock the cam against further movement in case a slippage of the rope should take place, and this locking of the cam will occur before it has moved a sufficient distance to release the grip of the clip on the rope. There being two pair, preferably, of the lugs on each side of the clip, it is evident that the cam will be locked against movement in either direction to hold the clip against slippage arising from a strain on either end of the rope.

I claim as my invention:

1. A rope clip comprising a U-shaped bolt, a block mounted to slide on the arms of said bolt and having a part to straddle the rope ends for clamping said block on the rope, a cam loosely mounted on the curved portion of the bolt and having a gripping face opposing the face of said block and said cam having means to engage said block and limit the rotary movement of said cam on said bolt.

2. A rope clip comprising a U-shaped bolt, a block having sockets therein to receive the arms of said bolt and a gripping face to engage the rope, nuts for the arms of said bolt, a cam loosely mounted on the curved portion of said bolt and having lugs formed thereon, said block having means projecting into the path of said lugs for limiting the rotary movement of said cam in both directions.

3. A rope clip comprising a U-shaped bolt, a block having sockets therein to receive the arms of said bolt and a gripping face to engage the rope, nuts for said bolt, a cam loosely mounted on the curved portion of said bolt and having a surface for engaging the rope, said cam having lugs projecting outwardly on each side thereof adjacent its bearing face and upon each side of the bolt and said block having projections formed thereon extending into the path of said lugs and forming stops with which said lugs engage when said cam has moved to a predetermined point through the slipping of the rope.

In witness whereof, I have hereunto set my hand this 12th day of January, 1918.

OLIVER CROSBY.